Sept. 13, 1960     D. L. BABCOCK ET AL     2,952,195
BUILT-IN FILTER AND INDICATOR FOR CAMERAS
Filed Oct. 27, 1958
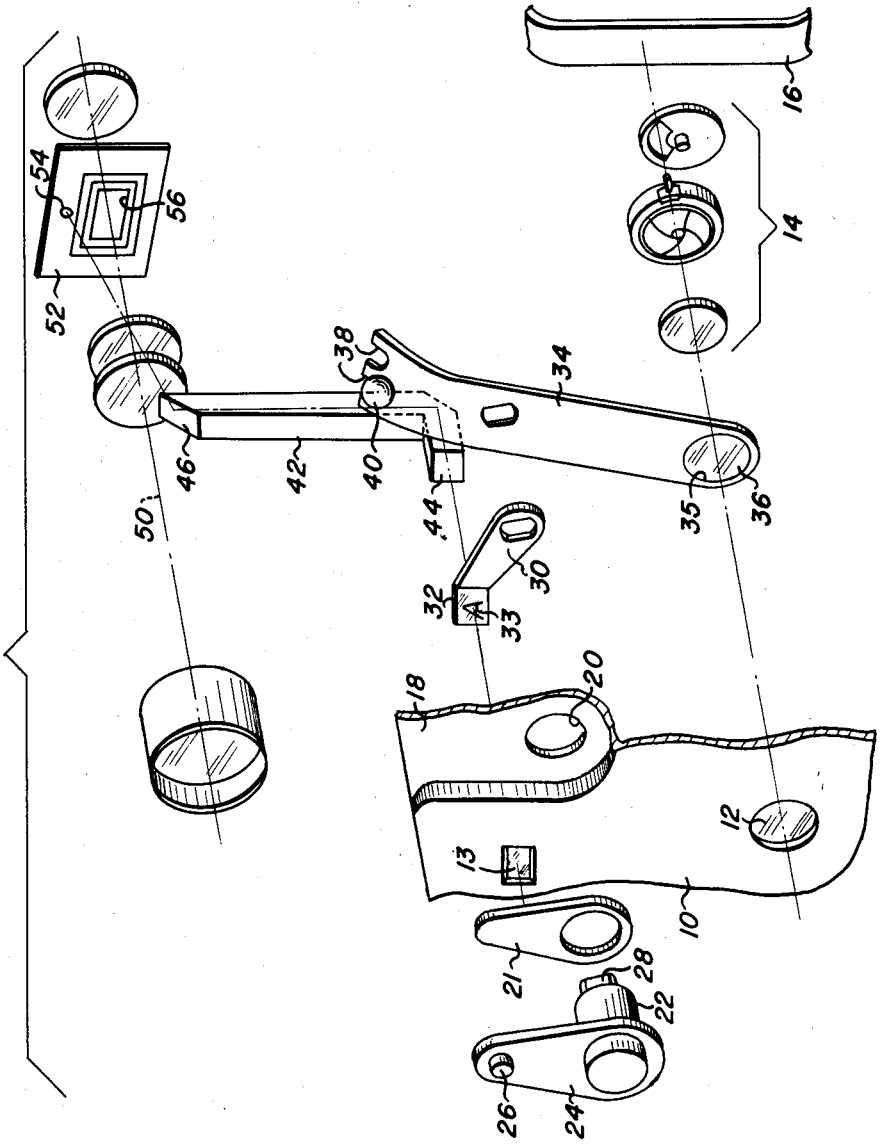
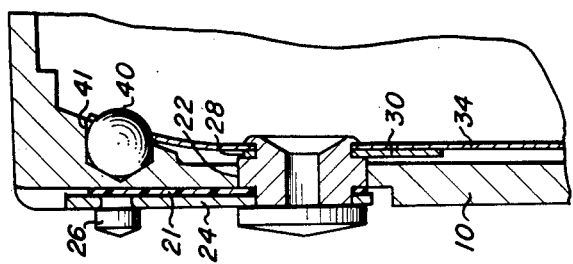
DAVID L. BABCOCK
EDWARD S. McKEE
INVENTORS
BY R. Frank Smith
Robert W. Hampton
ATTORNEYS

United States Patent Office 2,952,195
Patented Sept. 13, 1960

2,952,195

BUILT-IN FILTER AND INDICATOR FOR CAMERAS

David L. Babcock and Edward S. McKee, Rochester, N.Y., assignors to Eastman Kodak Company, Rochester, N.Y., a corporation of New Jersey Filed Oct. 27, 1958, Ser. No. 769,685

5 Claims. (Cl. 95—11)

The present invention concerns lens filters for photographic cameras and more particularly concerns a filter built into a camera and having operating and nonoperating positions, with a signal indicating the position of the filter.

In most prior art cameras adapted for use with a lens filter, the filter is a separate device that must be carried separately when it is not in use and must be attached to the camera for use. A few prior art cameras have been provided with built-in filters and mechanisms for shifting the filters into and out of alignment with the lens systems of the cameras. Such shifting mechanisms usually have been complex and expensive and have been awkward to use because the operator had difficulty in remembering whether the filter was in or out of alignment with the lens system.

It is therefore a principal object of the present invention to indicate positively to a camera operator whether a filter that is built into the camera is in or out of alignment with the lens system of the camera.

It is a more particular object of the invention to provide such indication in the viewfinder of the camera.

Another object of the invention, with respect to a filter that is built into a camera, is to provide an inexpensive and reliable mechanism for shifting the filter into and out of alignment with the lens system of the camera.

A further object of the invention, with respect to a shiftable filter built into a camera, is to provide a dual indication of the position of the filter, so that the camera operator will be apprised of the filter position both when setting exposure values into the camera and when he is looking into its viewfinder.

Other objects of the invention will appear from the following description, reference being made to the accompanying drawing, wherein:

Fig. 1 is an exploded perspective view of the invention in relation to other parts of the camera; and Fig. 2 is a sectional left side view of the filter control and detent mechanisms.

Although the invention as shown and described is embodied in a motion picture camera, it will readily be seen to have equal utility in a still camera. Referring to the drawing, the front cover 10 of a camera body or housing has a first window 12 that is aligned with the usual lens, diaphragm and shutter system, shown schematically at 14, for projecting an image of a viewed scene onto a photosensitive film 16. The lens, diaphragm and shutter elements may be of any type well known in the art and will not be described in detail.

The front panel 10 of the camera body has a recess 18 with a circular aperture 20 adapted to receive the hub 22 of a manually operable member, illustrated as a crank lever 24. Hub 22 is adapted to rock within aperture 20 in response to manual operation of lever 24 by means of a knob 26 secured to the outer end of the lever. A spacing member 21, preferably formed of nylon, may be mounted on hub 22 between lever 24 and the camera front for minimizing the frictional resistance to the manual rocking of lever 24.

Hub 22 has an oblong or other key-shaped axial extension 28 that protrudes through aperture 20 in the camera front. An indicating arm 30 and a filter lever 34 are secured to extension 28 of hub 22 for rocking motion with the hub. Lever 34 may be formed as a leaf spring, preferably of steel, and has on one end an aperture 35 in which is mounted a filter 36. The filter may be of any type and is illustrated as the well known type "A." The other end of lever 34 has a pair of depressions, illustrated as open slots 38, that cooperate with a ball 40, which is mounted in a recess 41 in the inside surface of the camera front 10. As shown best in Fig. 2, ball 40 is so positioned that it exerts a bending force on the slotted end of the leaf-spring filter lever 34 and detents that lever, as well as hub 22 and lever 24, in either of the two angular positions where a slot 38 is centered on the ball. The spring force of lever 34 retains ball 40 in recess 41 of the camera front.

Arm 30 has at its end an indicator 32 and rocks this indicator into and out of alignment with a second window 13 in camera front 10 when lever 24 is rocked between its two detented positions. A letter signal 33 may be provided on indicator 32 to indicate in window 13 the type of filter that is aligned with the camera lens system when indicator 32 is aligned with window 13. Indicator 32 also may be tinted to correspond to the color of the filter 36.

In accordance with the invention, indicator 32 also may be seen through the viewfinder of the camera. For this purpose the indicator may be made of either a light-transmitting material, such as a clear plastic, or any opaque material which of course may be tinted as described above. A prism or other light conductor such as a Lucite rod, shown at 42, has an input surface 44 aligned with and substantially parallel to window 13 in the camera front. An output surface 46 of the light conductor is disposed in cooperative relation with the camera viewfinder, the center line of which is indicated at 50. The viewfinder may be of any well known type and may be provided with a mask 52 having a first aperture 54 for framing light from the output of the light conductor 42 and a second aperture 56 for framing light from the viewed scene.

In summary, it is seen that when lever 24 is manually rocked to its detented position in which filter 36 is aligned with window 12 and the lens system of the camera, indicator 32 is moved into alignment with window 13 and with the input surface 44 of light conductor 42 and is therefore visible both from the front of the camera and through the viewfinder.

The invention has been described in detail with particular reference to preferred embodiments thereof, but it will be understood that variations and modifications can be effected within the spirit and scope of the invention as described hereinabove and as defined in the appended claims.

We claim:

1. In a camera having a housing and having a lens system for focusing an image of a viewed scene onto a photosensitive surface inside said housing, the combination comprising: a manually operable member supported on said housing for rocking movement; a leaf spring secured to said member inside said housing for rocking movement therewith and having a pair of recesses in one end thereof, said recesses having a path of movement, upon rocking of said member, adjacent a depression in an inner surface of said housing; a ball member interposed between said inner surface of the housing and said one end of the leaf spring and retained by said leaf spring in engagement with said depression, said ball being disposed for engaging a respective one of said recesses in said leaf spring in each of two predetermined angular positions of said member and leaf spring for yieldably retainnig said leaf spring in either of said angular positions; an optical filter carried by said leaf spring, said filter being aligned with said lens system when said leaf spring is in a first of said angular positions and out of alignment with said lens system when said leaf spring is in the other of said angular positions.

2. The combination defined in claim 1, wherein said camera housing has a window; an indicator secured to said manually operable member for rocking movement therewith, said indicator being moved into and out of alignment with said window when said member is rocked from one of said two angular positions to the other.

3. The combination defined in claim 2 wherein the camera has a viewfinder mounted in front-to-back relation thereon, with: a light conductor positioned to receive light through said window and to transmit said light rearwardly into said viewfinder, whereby said indicator blocks at least a portion of the light entering through said window when and only when said filter is aligned with said lens system, thus providing a visual indication in the viewfinder as to the position of the filter.

4. In a camera having a viewfinder and having a lens system for focussing an image of a viewed scene onto a photosensitive surface, the combination comprising: a light filter movably mounted on said camera; manually operable means for moving said filter into and out of a light filtering position in relation to light being focussed by the lens system onto said photosensitive surface; a unitary light conductor mounted in said camera for receiving light from the exterior of said camera along a predetermined path and transmitting said light rearwardly into said viewfinder; and an indicator secured to said filter for movement into and out of said path in response to movement of said filter into and out of said light filtering position.

5. The combination defined in claim 4, with: a mask in said viewfinder having a first aperture for framing light transmitted from said light conductor and having a second aperture for framing light from the viewed scene.

References Cited in the file of this patent
UNITED STATES PATENTS 1,613,363     Tessier _____ Jan. 4, 1927